(12) United States Patent
Milic-Frayling et al.

(10) Patent No.: US 7,614,004 B2
(45) Date of Patent: Nov. 3, 2009

(54) INTELLIGENT FORWARD RESOURCE NAVIGATION

(75) Inventors: Natasa Milic-Frayling, Cambridge (GB); Samuel Gavin Smyth, Huntingdon (GB); Anthony Francis Frayling, Cambridge (GB); Kerry Rodden, Palo Alto, CA (US); Rachel Jones, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 930 days.

(21) Appl. No.: 10/839,903

(22) Filed: May 5, 2004

(65) Prior Publication Data

US 2005/0132296 A1 Jun. 16, 2005

Related U.S. Application Data

(60) Provisional application No. 60/529,823, filed on Dec. 15, 2003.

(51) Int. Cl.
G06F 3/00 (2006.01)
G06F 9/00 (2006.01)
G06F 17/00 (2006.01)

(52) U.S. Cl. ................ 715/762; 715/763; 715/811; 715/764

(58) Field of Classification Search ........... 715/760, 715/762, 763, 764, 811
See application file for complete search history.

(56) References Cited

U.S. PATENT DOCUMENTS 5,603,034 A * 2/1997 Swanson ............... 717/111
6,037,934 A * 3/2000 Himmel et al. ........... 715/760
6,243,091 B1 6/2001 Bertis
6,686,918 B1 * 2/2004 Cajolet et al. ........... 345/473
2001/0034742 A1 * 10/2001 Stinson ................. 707/501.1
2002/0060701 A1 * 5/2002 Naughton et al. ......... 345/853
2002/0078043 A1 6/2002 Pass et al.
2003/0046366 A1 3/2003 Pardikar et al.
2003/0132957 A1 * 7/2003 Ullmann et al. ........... 345/738
2003/0200505 A1 * 10/2003 Evans ..................... 715/507
2004/0001092 A1 * 1/2004 Rothwein et al. ......... 345/763
2004/0003351 A1 * 1/2004 Sommerer et al. ........ 715/517
2004/0064438 A1 * 4/2004 Kostoff ..................... 707/1
2004/0148591 A1 * 7/2004 Kumhyr et al. ........... 717/137
2005/0021494 A1 * 1/2005 Wilkinson ................. 707/1
2005/0132018 A1 6/2005 Milic Frayling et al.
2005/0132297 A1 6/2005 Milic Frayling et al.

OTHER PUBLICATIONS

"Girafa" Internet Web Site Published at www.girafa.com, at least as early as Jan. 2004.
"Opera" Internet Web Site, Features and Functions Published at http://www.opera.com/features/, at least as early as Mar. 2004.

(Continued)

*Primary Examiner*—Tadesse Hailu
*Assistant Examiner*—Anita D Chaudhuri

(57) ABSTRACT

Implementations are described and claimed herein to enable a user to quickly and efficiently locate preferred web pages or resources based on previous navigation. Implementations may utilize an "intelligent forward" resource navigation scheme which analyzes a user's navigation to determine web pages or resources that the user is likely to target. Shortcuts to the "forward target resources" may be presented in a manner that allows the user to readily and directly access a desired web page or resource without having to navigate among a series of intervening web pages or resources. In addition, the forward target resources may be ranked (e.g., based on frequency of access) and shortcuts may be presented to the user based on rank.

41 Claims, 9 Drawing Sheets

OTHER PUBLICATIONS

"Apple-Safari" Internet Web Site, Published at http://www.apple.com/safari/, at least as early as Mar. 2004.

Ayers, E. Z., Stasko, J. T.; "Using Graphic History in Browsing the World Wide Web", Technical Report GIT-GVU-95-12, May 1995, 14 pages.

Catledge, L. D., Pitkow, J. E.; "Characterizing Browsing Strategies in the World-Wide Web", Computer Networks and ISDN Systems v26 n6, Dec. 1998 pp. 1065-1073.

Cockburn, A., Greenberg, S., McKenzie, B., Jasonsmith, M, Kaasten, S.; "WebView: A Graphical Aid for Revisiting Web Pages" In 'Proceedings of the OZCHI'99 Australian Conference on Human Computer Interaction', Nov. 1999, 6 pages.

Cockburn, A., Jones, S.; "Which Way Now? Analysing and Easing Inadequacies in WWW Navigation" International Journal of Human-Computer Studies v45 i1, Jul. 1996, pp. 105-129.

Cockburn, A., McKenzie, B.; "What do Web Users Do? An Empirical Analysis of Web Use" International Journal of Human-Computer Studies v54 i6, Jun. 2001, pp. 903-922.

Greenberg, S., Cockburn, A.; "Getting Back to Back: Alternate Behaviors for a Web Browser's Back Button" In Proceedings of the 5th Annual Human Factors and the Web Conference held at NIST, Gaithersburg, Maryland, Jun. 1999, 8 pgs.

Kaasten, S., Greenberg, S.; "Integrating Back, History and Bookmarks in Web Browsers" In Extended Abstracts of the ACM Conference of Human Factors in Computing Systems, ACM Press, 2001, pp. 379-380.

McKenzie, B., Cockburn, A.; "An Empirical Analysis of Web Page Revisitation" HICSS archive Proceedings of the 34th Annual Hawaii International Conference on System Sciences v5, 2001, 9 pgs.

Milic-Frayling, N., Sommerer, R., Tucker, R.; "MS WebScout: Web Navigation Aid and Personal Web History Explorer", In Proceedings of WWW2002 Honolulu, Hawaii, May 2002, 6 pages.

Milic-Frayling, N., Sommerer, R., Rodden, K.; "WebScout: Support For Revisitation of Web Pages Within a Navigation Session", IEEE/WIC International Conference on Web Intelligence Halifax, Canada, Oct. 2003, 5 pages.

Tauscher, L., Greenberg, S.; "How People Revisit Web Pages: Empirical Findings and Implications for the design of History Systems", International Journal of Human-Computer Studies, v47, 1997, pp. 97-137.

Milic-Frayling, N., Sommerer, R., Rodden, K.: "WebScout: Support for Revisitation of Web Pages within a Navigation Session", IEEE/WIC International Conference on Web Intelligence Halifax, Canada, Oct. 2003, 5 pages.

* cited by examiner

US 7,614,004 B2

INTELLIGENT FORWARD RESOURCE NAVIGATION

RELATED APPLICATIONS

This patent application claims priority from U.S. Provisional Patent Application Ser. No. 60/529,823, filed on Dec. 15, 2003, and entitled "Smart Navigation Systems and Methods", which is incorporated herein by reference for all that it discloses. This patent application is also related to co-owned U.S. patent application Ser. No. 10/839,924, entitled "Intelligent Backward Resource Navigation", and U.S. patent application Ser. No. 10/839,910, entitled "Browser Session Overview", each hereby incorporated herein by reference for all that they disclose.

TECHNICAL FIELD

The described subject matter relates to resource browsing, and more particularly to systems and methods for intelligent forward resource navigation.

BACKGROUND

A browser is a computer application program that enables a user to browse or otherwise access web pages and/or other resources such as, e.g., web-based applications, network storage, etc. (hereinafter generally referred to as resources). The user may access a resource, e.g., by specifying the resource by its universal resource identifier (URI) or "clicking" on hypertext links. Often, the user has to navigate among a series of intervening web pages to access the desired resource. For example, the user may enter the URI for a news agency's Internet home page, click on a hypertext link for the news agency's business section web page, and then click on another hypertext link for the international travel web page in order to access an online currency conversion application provided by the news agency.

Browser applications may be provided with various tools that allow the user to more readily access a desired resource without having to step through a series of intervening web pages. For example, the browser application may automatically record a "history" of the user's navigation. The user may also manually "bookmark" particular resources. The user may revisit a particular resource, e.g., by selecting the resource from a "history" list or from a "favorites" list. The browser application may also include an "autocomplete" function, wherein the browser application suggests resources from the user's history or favorites lists as the user types the URI of a particular resource, e.g., in the browser's address field. A "dropdown" menu of resources may also be displayed based on the user's history or favorites lists adjacent the address field from which the user may select the desired resource.

While these tools allow the user to directly access a desired resource, these tools are often time-consuming and may be confusing for the user. For example, the history or favorites lists may become populated with URIs for many different resources. In addition, the history or favorites lists are typically disconnected from the current user tasks and therefore are not presented in an order that is context sensitive. Accordingly, it may be difficult for the user to readily identify a desired resource. In addition the user interface of these tools is not closely integrated with the browsing interface which increases the effort required to access resources. The user often just ignores these tools and the user continues to repeat navigation steps and browse among series of intervening web pages to access a desired resource.

SUMMARY

Implementations are described and claimed herein to enable a user to quickly and efficiently locate preferred web pages or resources based on previous navigation. Implementations may utilize an intelligent forward resource navigation scheme which analyzes navigation for a user profile to determine web pages or resources that the user profile is likely to target. Shortcuts to the "forward target resources" may be presented in a manner that allows the user profile to readily and directly access a desired resource without having to navigate among a series of intervening resources. In addition, the forward target resources may be ranked (e.g., based on recency and frequency of access) and shortcuts may be presented to the user based on rank.

An exemplary implementation of a system for navigating among resources includes an analysis module to analyze previous navigations performed by a user profile during one or more previous browser sessions. The system may also include a prediction module to predict a set of ranked forward targets, e.g., relative to a current navigation context, based on user profile navigation patterns, content of visited resources and other characteristics of visited resources or resource usage.

An exemplary implementation of a method includes statistically analyzing previous navigations performed by a user profile during one or more previous browser sessions, and predicting a set of ranked forward targets, e.g., relative to a current navigation context.

In some implementations, articles of manufacture are provided as computer program products. One implementation of a computer program product provides a computer program storage medium readable by a computer system and encoding a computer program for intelligent forward resource navigation.

An exemplary computer program product encodes a computer to statistically analyze previous navigations performed by a user profile during one or more previous browser sessions, and predict a set of ranked forward targets, e.g., relative to a current navigation context.

DETAILED DESCRIPTION

Briefly, intelligent forward resource navigation analyzes navigation for a user profile (e.g., an individual user, a collaboration of users, the same user having different accounts) to predict forward target resources that the user may want to access again, and provides the user with shortcuts to these resources. In addition, intelligent forward resource navigation may rank forward target resources (e.g., based on frequency of access) and the shortcuts to these resources may be displayed for the user based on rank.

By way of example, a user may access a currency conversion application by starting at a home page and following hypertext links through various intervening web pages until the user finds the currency conversion application. Exemplary implementations of intelligent forward navigation determine that the currency conversion application is the forward target resource and provides the user with a currency conversion application shortcut. If the user accesses the currency conversion application more frequently than other resources, the currency conversion application may be assigned a high rank and the currency conversion application shortcut may be prominently presented to the user (e.g., first in a list).

Accordingly, the user does not have to navigate among intervening web pages to access the forward target resource. In addition, forward target resources may be readily identified without having to search through cumbersome lists of URIs to find the forward target resource.

By way of another example, a user may frequently access pages on various Web sites, e.g., news sites, during common browser sessions, e.g. by first visiting pages on www.cnn.com, then proceeding to pages on www.nytimes.com, then to pages on www.msnbc.com, and so on. Exemplary implementations of intelligent forward navigation determine that various Web sites or resources are frequently visited within a common browsing session. Each time a site of such a group of sites is visited in a new browsing session, exemplary implementations can provide shortcuts to the other sites in the group that have not yet been visited by the user in the new browsing session.

Accordingly, the user does not have to type the URIs of the next site of the common group that the user frequently visits. Instead, shortcuts to these other sites are presented whenever a site of the group is visited.

Exemplary System

Figure 1:
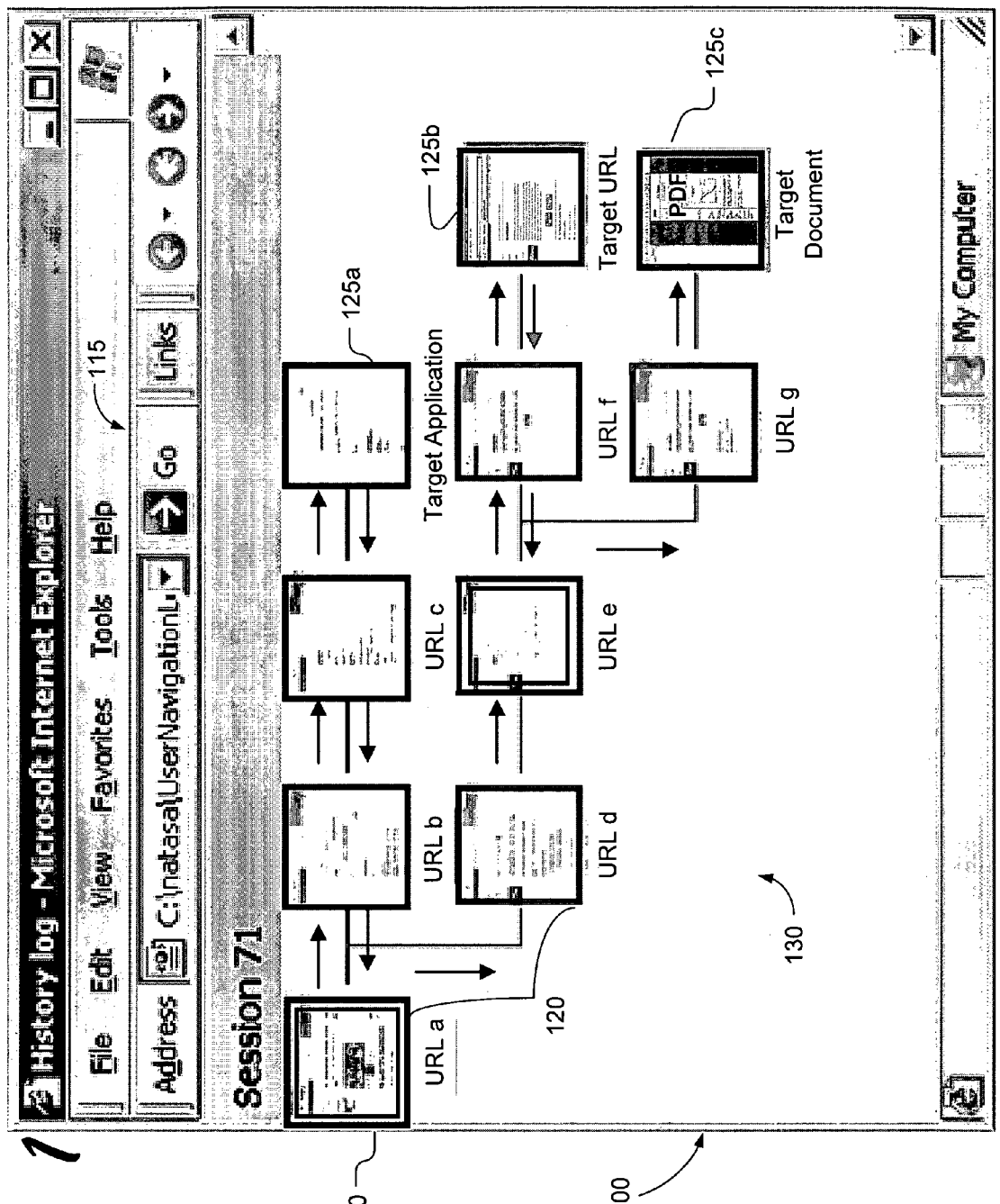
FIG. 1 illustrates exemplary resource navigation.

FIG. 1 illustrates exemplary resource navigation. A browser application (also referred to as a browser) 100 may be used for resource navigation. Any suitable browser may be used for intelligent forward navigation, such as, e.g., Microsoft Internet Explorer. In general, browser 100 may include a display window 110 having a number of functions 115 (e.g., File menu, Edit menu, Address field) for navigating among and viewing or otherwise accessing resources 120.

Before continuing, it is noted that resources 120 are not limited to any particular type of resource and may include, by way of example, web pages, documents, audio, video, computer applications, and any of a wide variety of other types of resources. In addition, a resource may be remote (e.g., online) and/or local to the user's computer. For example, resources may include web pages stored at a remote server (e.g., on the Internet or an Intranet) and/or web pages stored in a local cache.

Navigation is illustrated in FIG. 1 by navigation map 130. Resources 120 are represented by icons according to a tree structure in a manner which the user may access the resources 120. By way of example, the user may start a session by accessing "URL a", e.g., by entering the URI for "URL a" in the browser's address field. From "URL a", the user may then "branch" to "URL b", e.g., by clicking on a hyperlink from "URL a". Navigation may proceed via "URL c" to a forward target resource (e.g., "Target Application" 125a). The user may then "back up" the navigation path to "URL a", e.g., using a traditional back button provided with the browser 100. This time the user may branch from "URL a" to "URL d". Navigation may proceed sequentially to another forward target resource (e.g., "Target URL" 125b) via "URL d", "URL e", and "URL f". Alternatively, the user may also manually enter a resource identifier for a forward target resource (e.g., "Target Document" 125c).

According to exemplary implementations of intelligent forward resource navigation, the user's navigation is analyzed to determine resources that the user is targeting. Predictions for intelligent forward resource navigation may be based on the current navigation node and/or the current context. In an exemplary implementation, the context may be the currently viewed resource. In another exemplary implementation, the context may be based on the entire navigation history. In yet other examples, the context may include the current navigation session, the last navigation session, user activities in other applications, time and date information, etc.

Predictions may be independent of the currently viewed resource. For example, predictions may be based on the entire navigation history or some subset of it. The predictions are based on information about the frequency and recency of target resources. These may include, e.g., True Favorites, discussed in more detail below.

Predictions may also be relative to the currently viewed resource. For example, prediction of the next resource may be relative to the currently viewed resource and consider only selected type of resources (i.e., only beginnings of navigation trails, user-entered URLs, search results, Intelligent Backward Navigation targets). Other resources need not be used in the analysis. Instead, the navigation history is used to identify the forward target resources that are typically visited before or after the currently viewed target resource within the same navigation session. These may include, e.g., Intelligent Favorites.

In another example, prediction of the next resource may be relative to the currently viewed resource and uses analysis of the navigation trails (i.e., navigation sequences following hyperlinks) which involve the currently viewed resource. The analysis suggests resources that are typically accessed subsequently or before the currently viewed resource through one or more hyperlink navigation. These may include, e.g., Navigation Sequence predictions and Related Resource predictions, discussed in more detail below.

In another example, prediction of the next resource may be relative to the currently viewed resource and uses analysis of navigation sequences of predefined length (e.g., 3 or 4 navigation steps) which involve the currently viewed resource. Analysis suggests resources that are typically accessed subsequently to the currently viewed resource through one or more hyperlink navigation. These may include, e.g., Intelligent Predictions.

In any event, shortcuts to the forward target resources may then be provided that allow the user to readily and directly access a desired resource without having to navigate among a series of intervening web pages each time the user desires access to the forward target resource. In addition, the forward target resources may be ranked (e.g., based on frequency of access, estimated likelihood that the user may next request the particular resource, etc.) and shortcuts may be presented to the user based on rank. As multiple types of predictions may be performed, a method of combining predicted resources will be used to facilitate display of predictions for user selection. These and other implementations of intelligent forward navigation are described in more detail below.

Figure 2:
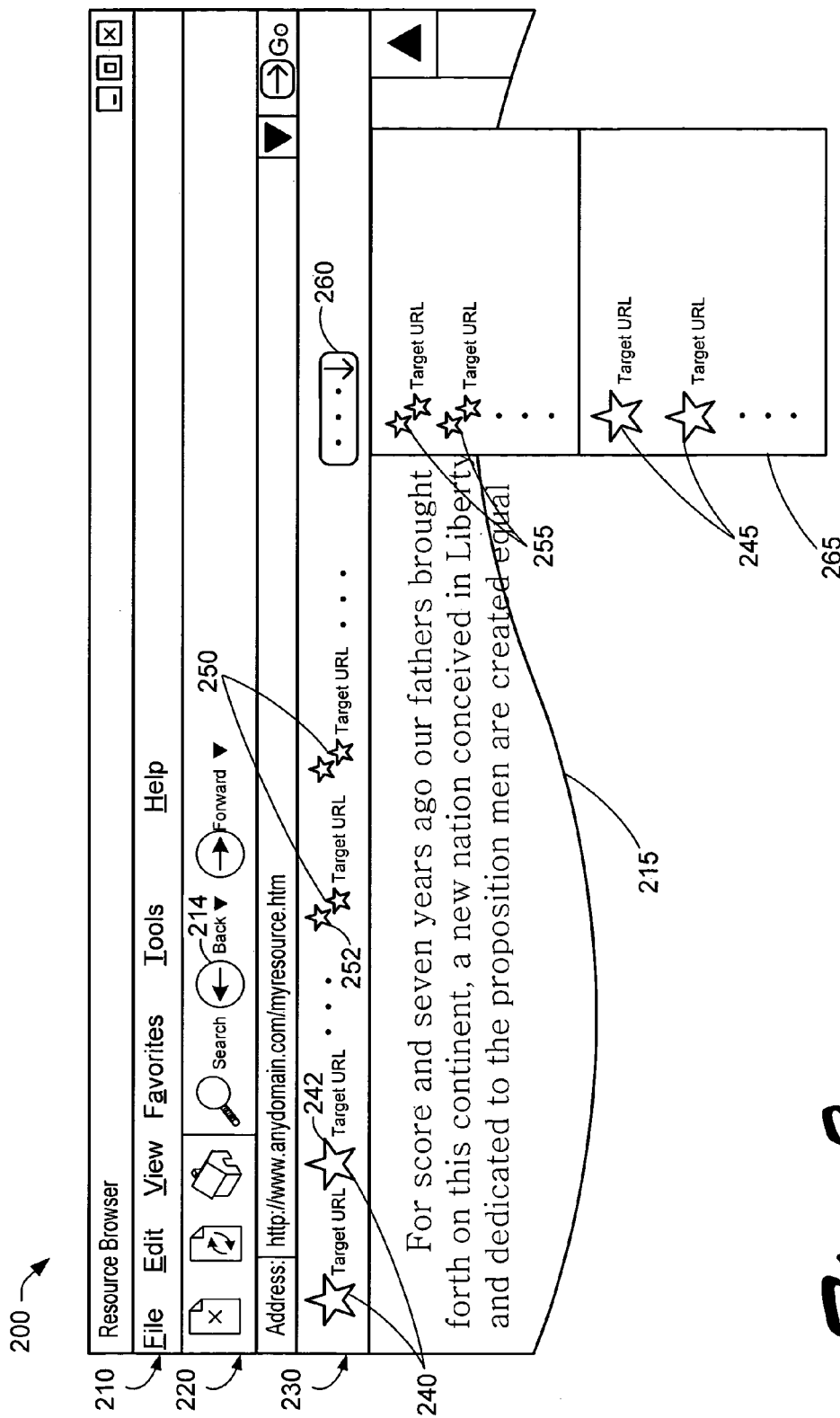
FIG. 2 is an exemplary user interface for intelligent forward navigation.

FIG. 2 is an exemplary user interface for intelligent forward navigation. User interface may be implemented, e.g., by browser 200. Browser 200 may include traditional navigation tools for accessing resources. For example, a menu 210 and tool bar 220 includes a list of "favorites" for recording and accessing bookmarked resources, a "home" icon for accessing a home page, a "search" icon for accessing a search engine, a back button, a forward button, and an address field for manually entering a resource identifier.

In exemplary implementations of intelligent forward navigation, browser 200 may also include intelligent forward navigation tools 230 (e.g., buttons) such as, e.g., one or more "true favorites" and "intelligent favorites" button(s) 240 and one or more "navigation sequence" and "related resource" button(s) 250. The true favorites buttons 240 may include links to forward target resources that are frequently and recently accessed by the user. Button(s) 240 may include intelligent favorites links to resources that are frequently visited during the same navigation session. Button(s) 250 may provide links to resources from predicted "navigation sequences" which are typically accessed by the user in a sequence of navigation steps from the currently viewed resource. Button(s) 250 may also be associated with "related resources" which have been accessed by the user in the same trail of navigation, before or after visiting the current resource. The trail of navigation can be defined as a sequence of navigation that starts with a selected type of resource, such as a resource accessed by typing in resource URI or selecting a favorite resource from the favorites list, or similar.

In the current implementation buttons 240 and 250 are designated by icons 242 and 252, respectively, reflecting the single or multiple types of predictions accessible by clicking on the buttons. In another implementation a distinct icon is used to designate buttons of each distinct type of predicted resources. In yet another implementation all the predicted resources are accessed through buttons uniformly designated by the same icon. Display order of the types of prediction buttons may be specified by the user. In another implementation the order eliminates from the display resource links that may be presented by other displays in the user interface, such as links to Intelligent Backward Navigation. In another implementation the display is automatically modified based on the analysis of resource navigation or usage of the prediction buttons by the user profile.

If the user selects one of the intelligent forward navigation tools on toolbar 230, the browser navigates directly to the forward target resource. By way of example, one of the true favorites buttons 240 may be associated with the resource identifier "www.cnn.com". If the user selects this true favorites button 240, the browser navigates to the forward target resource provided at www.cnn.com (e.g., the CNN home page). The browser may replace the current display in browser window 215 with contents from the forward target resource. Intelligent favorites buttons 250 may be used similarly to directly access forward target resources.

Intelligent forward navigation tools 230 may also include an overflow button 260. The user may select the overflow button 260 to display additional forward target resources. If the user selects or "clicks" on the overflow button 260, an overflow menu 265 displays additional forward target resources, as the toolbar can display only a limited number of resource identifiers. In an exemplary implementation, the overflow menu may be populated with a number of intelligent navigation buttons (or links) 255 that may correspond to true favorites and intelligent favorites followed by up to a number of resource identifiers 245 corresponding to navigation sequence resources and related resource, where the number of presented links can be specified by the user. In another implementation the ordering of different types of predicted resources in the overflow menu 265 can be specified by the user. In yet another implementation the ordering and number of predicted resources is modified based on the analysis of the navigation pattern and usage of predicted resources by the user profile The intelligent forward navigation tools 230 may be displayed according to any suitable display format. By way of illustration, two intelligent favorites buttons 250 may be displayed, with the remaining space available for true favorites buttons 240. In addition, the intelligent forward navigation tools 230 may be displayed from left to right based on a rank of the forward target resource (e.g., most frequently accessed is displayed first). Alternatively, the navigation buttons may be displayed, e.g., in temporal order (e.g., most recently visited displayed first), alphabetically by domain name, local resources first, remote resources first, etc. However, it is noted that the intelligent forward navigation tools are not limited to any particular display format.

Figure 3:
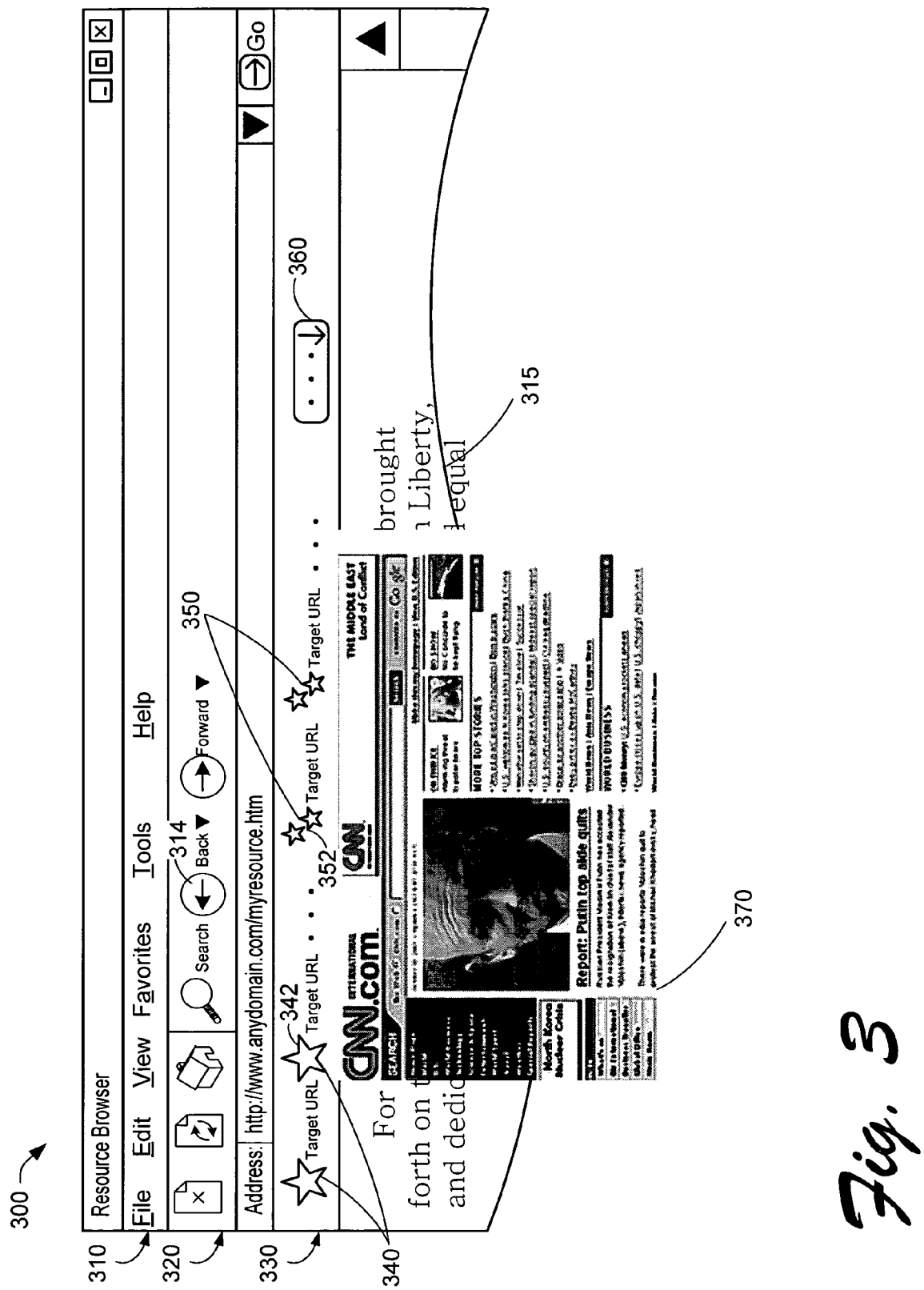
FIG. 3 is another exemplary user interface for intelligent forward navigation.

FIG. 3 is another exemplary user interface for intelligent forward navigation. Again, user interface may be implemented, e.g., in a browser 300. Browser 300 is shown including the navigation tools already discussed above with reference to the browser 200 shown in FIG. 2. Accordingly, 300-series reference numerals are used in FIG. 3 to refer to like elements.

In the exemplary implementation shown in FIG. 3, the user may open a preview window 370 (e.g., including a thumbnail image or other summary) of the forward target resource. For example, the user may "hover" over one of the intelligent forward navigation tools 330 (e.g., using a pointing device) to display the preview window 370. Optionally, the preview window 370 may be displayed over the current contents being displayed in the browser window 315, as shown in FIG. 3. Accordingly, the user can obtain summary information or preview the forward target resource without having to navigate to the forward target resource.

As discussed above, the user may access the forward target resource by selecting (e.g., by "clicking") the intelligent forward navigation tools 330. Alternatively, the user may select (e.g., by "clicking") the preview window 370. The browser then navigates to the forward target resource and may replace the current contents being displayed in the browser window 315 with contents from the forward target resource.

Figure 4:
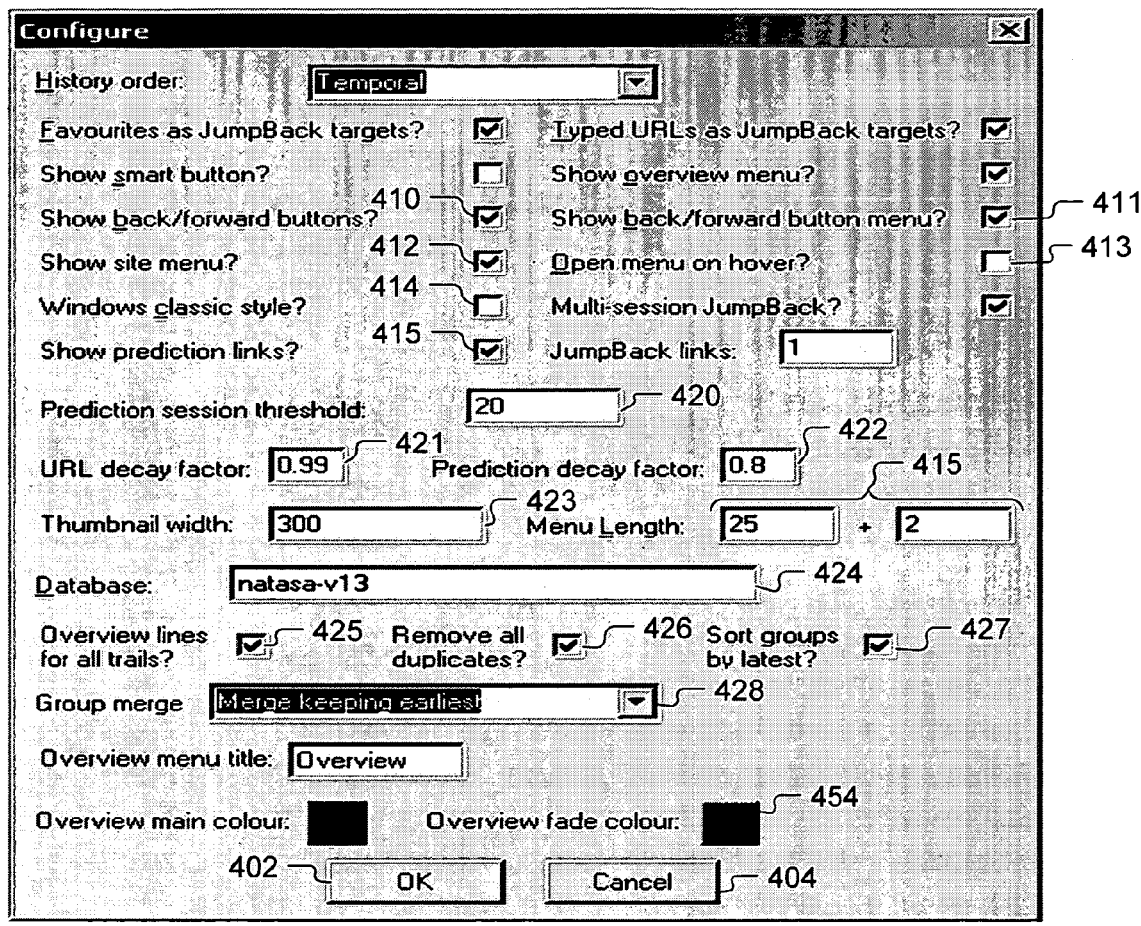
FIG. 4 is an exemplary configuration window for intelligent forward navigation.

FIG. 4 is an exemplary configuration window for intelligent forward navigation. Configuration window 400 may be used to configure a browser (e.g., the browser 200 in FIG. 2) to implement intelligent forward resource navigation. The user may access the configuration window 400 from a browser at any time to modify or inspect the current settings for intelligent forward resource navigation. As is common, the settings may be stored and persisted across browser sessions if the user selects the "OK" button 402. Alternatively, the current settings may be used if the user selects the "CANCEL" button 404.

With reference to FIG. 4, the exemplary configuration window 400 includes configuration options for traditional functions, such as, e.g., a "show back/forward buttons" selector 410, a "show back/forward button menu" selector 411, a "show site menu" selector 412, an "open menu on hover" selector 413, and a "WINDOWS classic style" selector 414, and a "menu length" field 415. Still other configuration options may also be provided.

The exemplary configuration window 400 also includes configuration options for intelligent backward resource navigation, and Overview functions. These functions and related configuration options are described in the related patent applications identified above and incorporated by reference. Further description of these functions and related configuration options is not needed for a complete understanding of intelligent forward resource navigation.

The exemplary configuration window 400 also includes configuration options for intelligent forward resource navigation. Configuration options may include a "prediction session threshold" field 420 which enables the user to specify a prediction session threshold related to intelligent forward navigation. A "URL decay factor" field 421 enables the user to specify a factor related to URL decay. A "prediction decay factor" field 422 enables the user to specify a prediction decay factor. A "thumbnail width" field 423 enables the user to specify the width of thumbnail images shown in the thumbnail preview window. A "database" field 424 enables the user to specify a database for storing navigation history information (e.g., details of navigation history events and resources, navigation history analyses, etc.) and configuration data. An "overview lines" selector 425 enables the user to specify whether overview lines are displayed for all navigation paths in a navigation map. A "remove all duplicates "selector 426 enables the user to specify whether duplicate forward target resources are removed from the navigation history. A "sort groups by latest" selector 427 enables the user to specify whether or not a group of resource identifiers in a common domain are sorted in sequential order according to time of visit. A "group merge" field 428 enables the user to specify a type of group merge or no group merge. In an exemplary implementation, group merges may include "merge with duplicates," "merge keeping latest," and "merge keeping earliest."

Figure 5:
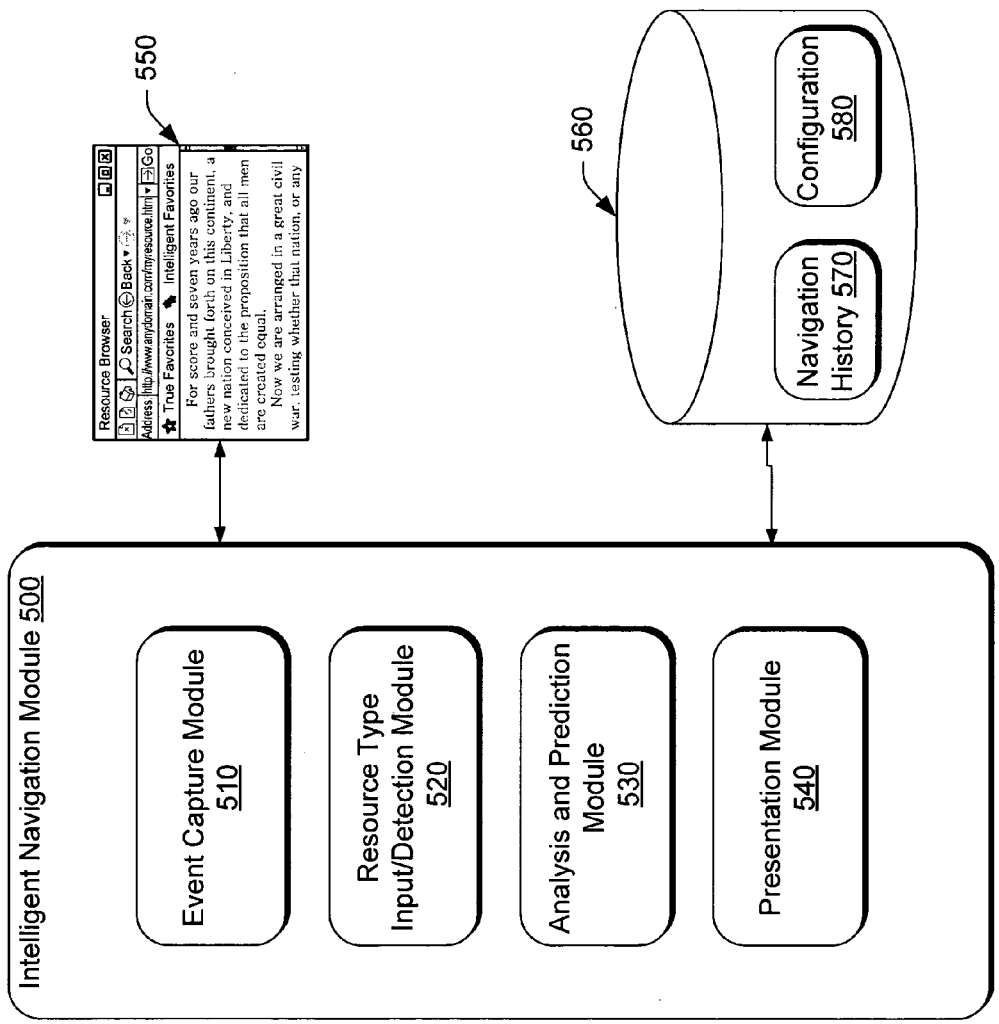
FIG. 5 is a functional block diagram of exemplary modules to implement intelligent forward navigation.

FIG. 5 is a functional block diagram of exemplary modules to implement intelligent forward navigation. Intelligent navigation module 500 facilitates intelligent forward resource navigation by analyzing user navigation (e.g., a recorded "history" of resource identifiers), and predicting forward target resources based on any of a wide variety of statistical algorithms.

Intelligent navigation module 500 may be implemented in computer-readable program code (e.g., software and/or firmware) stored in computer-readable storage or memory and executable by a processor (or processing units) at one or more clients computers. For example, the intelligent navigation module 500 may be included with the browser application program code. Alternatively, the intelligent navigation module 500 may be a stand-alone application (e.g., a plug-in or applet) that extends the capabilities of a browser.

The exemplary intelligent navigation module 500 shown in FIG. 5 includes an event capture module 510, a resource input/detection module 520, and an analysis and prediction module 530 to predict a set of ranked forward targets, e.g., relative to a current navigation context, and a presentation module 540.

Event capture module 510 may be implemented to detect and log navigation information, e.g., from browser 550. Navigation information may be stored as a navigation history 570 in computer-readable storage as data store 560. Navigation history 570 may include resource identifiers, the order of resource accesses, branching information and optionally other information related to the user's navigation. Navigation history 570 may include annotations on the resource type identified by various analyses modules operating on the navigation history data, such as Intelligent Backward Navigation targets or forward navigation targets as they are identified. Navigation history 570 may be accessed from data store 560 by the intelligent navigation module 500.

Resource type input/detection module 520 may be implemented to identify and designate various types of resource identifiers in the navigation history 570, including candidate forward target resources and forward target resources as they are identified by the forward resource detection methods performed by the analysis and prediction module 530. Resource type input/detection module 520 may receive identified type of resources, e.g., from user input, or input from another application or service. By way of example, a resource type may be Intelligent Backward Navigation target which may include search results pages, hubs, favorite resources, etc. These may be automatically designated as candidates for the forward target resources and as such included in the analyses performed by the analysis and prediction module 530. A resource may be designated as a forward target resource type (e.g., a "true favorite") if the user explicitly includes the resource identifier in the favorites list and requests the resource identifier to be displayed by the presentation module 540. Similarly, a resource may be designated as a non-forward resource type by the user and, as such, never included in the analyses for detecting forward navigation targets by module 530 or never displayed in the user interface by the presentation module 540.

A resource may also be automatically designated as a forward target resource (e.g., an "intelligent favorite"), based on analysis of the user's navigation habits. Analysis and prediction module 530 may be implemented to analyze navigation history 570, including information on resource type and content, as well as a structure and content of previous navigations performed by a user during one or more previous browser sessions. For example, content may include information from the resources such as, e.g., title of the resources, anchor text of the hyperlinks followed by the user, body of the document text, etc. In any event, the analysis may be used to predict a set of ranked forward targets, e.g., relative to a current navigation context. The predictions may be based on statistical algorithms that predict a set of forward targets relative to a current navigation context. That is, the predictions may be based on personal user navigation histories to predict re-visitation of the resource that the user has been using more or less frequently/routinely in the past.

Analysis and prediction module 530 may also be implemented to rank the forward target resources, e.g., based on frequency of access or likelihood estimation that the user intends to access a particular resource at a given point in user navigation. Exemplary analysis and ranking methods are described in more detail below with reference to FIGS. 6*a-c*. It is also noted that the functionality of analysis and prediction module 530 may be provided partially or in full by another application and/or service and provided to the intelligent navigation module 500, e.g., via resource type input/detection module 520.

If a resource is identified as a forward target resource, resource type input/detection module 520 then designates the resource as a forward target resource in the navigation history 570. A resource may be designated as a forward target resource by marking (e.g., setting a flag) or otherwise distinguishing the resource identifier for the forward target resource in the navigation history 570.

Presentation module 540 renders the intelligent forward navigation tools(s) (e.g., tools 230 in FIG. 2) based on the forward target resources identified, e.g., by the analysis and prediction module 530. It may take into account configuration settings for forward target resource displays, and methods for combining automatically and displaying possibly multiple types of forward navigation resources. Forward navigation presentation module 540 handles processing related to the intelligent forward navigation button. In general, the presentation module 540 detects selection of the intelligent forward navigation tools. If an intelligent forward navigation tool is selected, intelligent navigation module 500 selects a target resource identifier from the navigation history 570 and causes the browser 550 program to point to the selected forward target resource.

In addition to the navigation history 570, data store 560 may also be implemented to store configuration data 580 for intelligent forward resource navigation. Configuration data 580 may include user preferences (e.g., based on selections in the configuration window 400 shown in FIG. 4), in addition to any hard-coded configuration information (e.g., statistical algorithms).

Figure 6A:
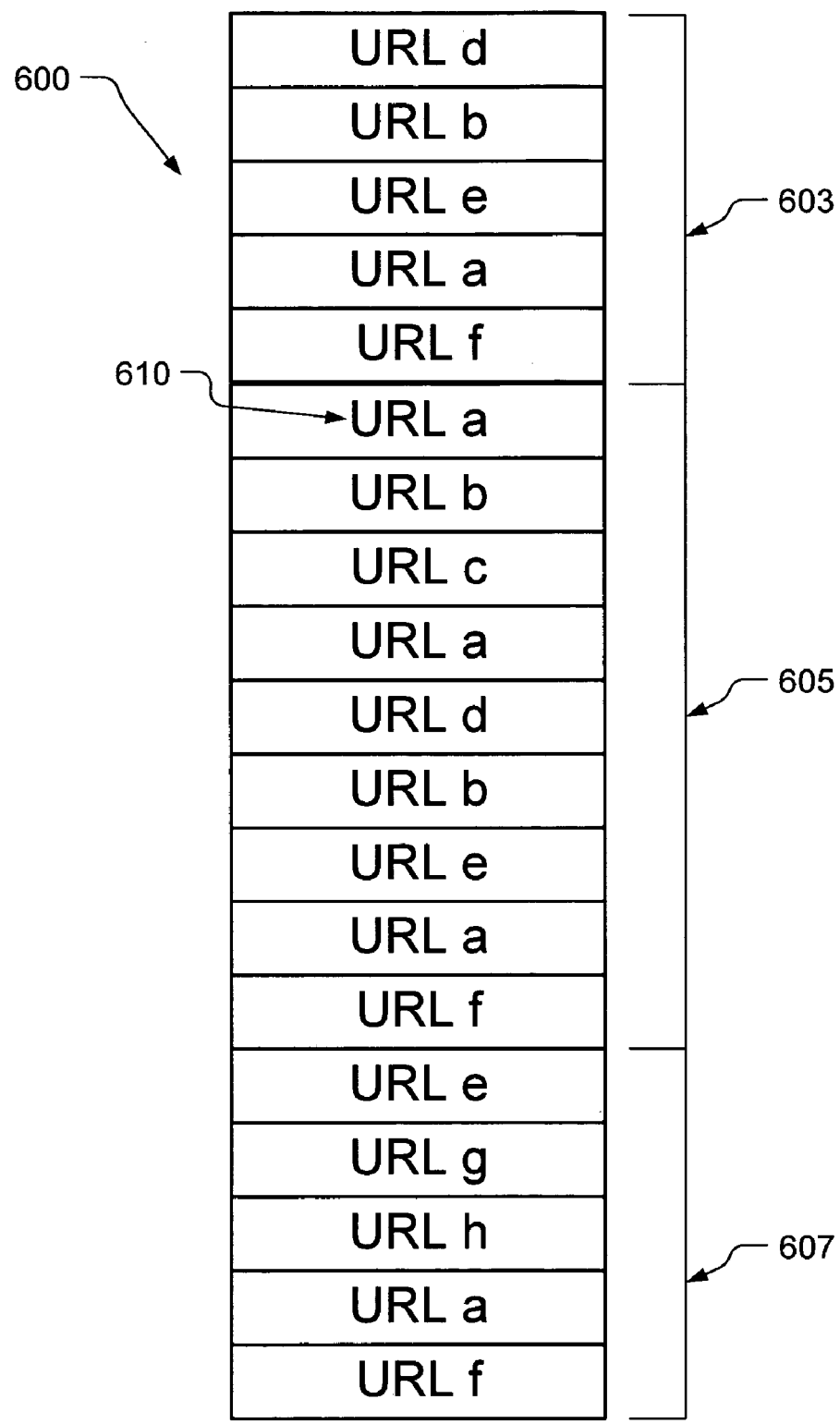
FIG. 6a illustrates an exemplary navigation history for intelligent forward navigation.

FIG. 6a illustrates an exemplary navigation history for intelligent forward navigation analysis. The navigation history 600 may include a structure of previous navigations, such as, e.g., a time ordered list of records representing the URL visits during navigation. In an exemplary implementation, navigation history 600 may be implemented as computer-readable data structures stored in computer-readable memory and may include resource identifiers 610 corresponding to accessed resources.

Navigation history 600 may include a number of navigation sessions 603, 605, and 607. By way of example, navigation sessions may be defined by a period of browsing inactivity (e.g., 180 minutes), and may be specified, e.g., using configure window 400 shown in FIG. 4. Each time a resource is accessed, the period since the last visit is calculated and if it exceeds this value a session ID is incremented.

It is noted that although letters a-f are used to designate resource identifiers 610 in FIG. 1, navigation history 600 may include any of a wide variety of suitable resource identifiers now known or later developed. For example, resource identifiers may include resource names, uniform resource identifiers (URIs) and/or uniform resource locators (URLs), to name only a few examples.

Figure 6B:
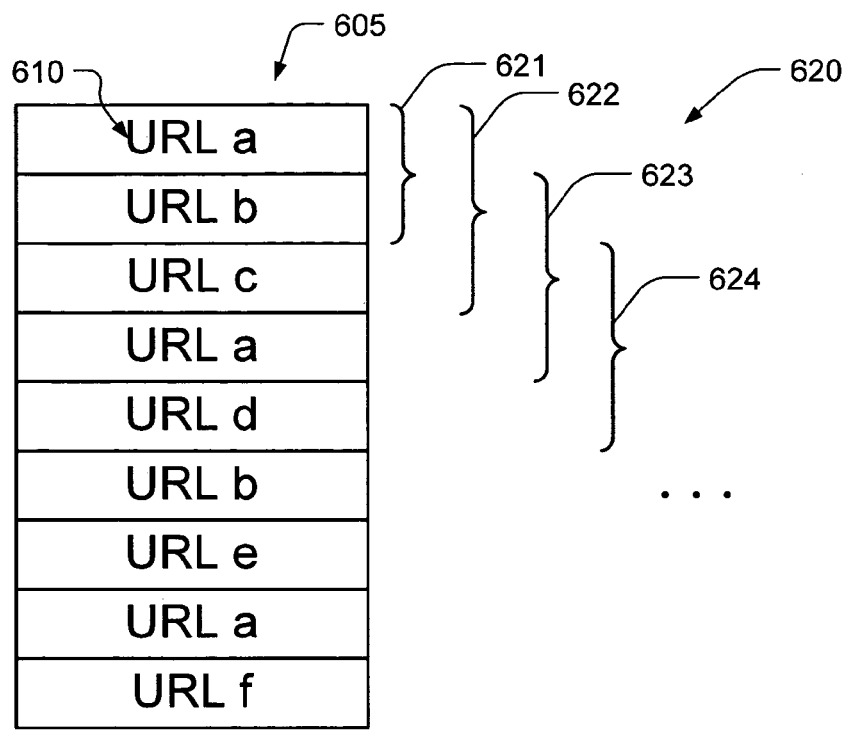
FIGS. 6b-c illustrate exemplary navigation sessions for intelligent forward navigation.
Figure 6C:
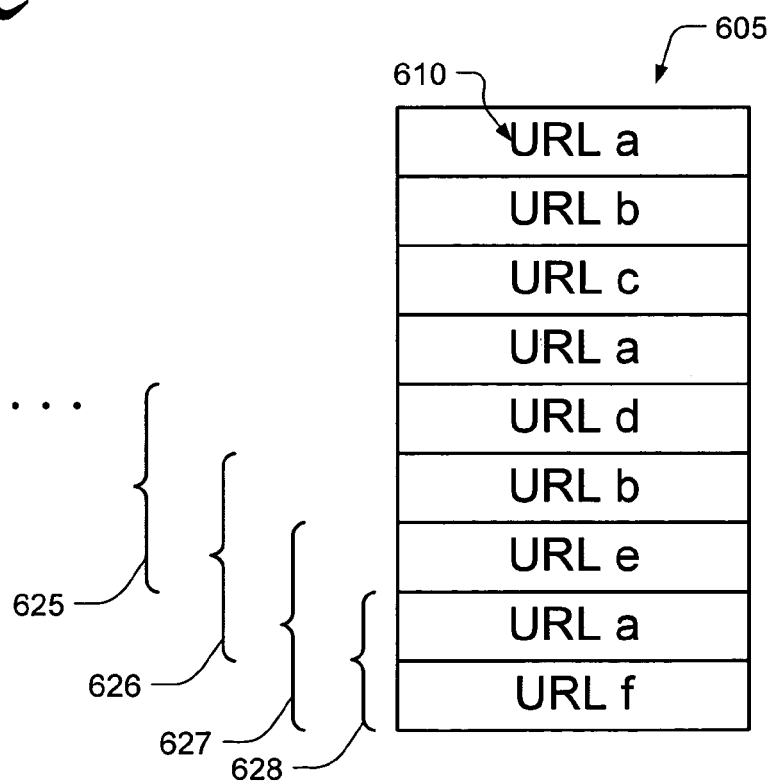

FIGS. 6b and 6c illustrate exemplary navigation sessions for intelligent forward navigation analysis. One of the navigation sessions 605 from FIG. 6a is shown in more detail in FIGS. 6b and 6c including a data list (e.g., a list of visited URLs).

Navigation history 600 and/or individual navigation sessions (e.g., session 605) may be statistically analyzed for intelligent forward resource navigation. Statistical analysis may be used to determine forward target resources for intelligent favorites (e.g., buttons 250 in FIG. 2) and/or forward target resources for true favorites (e.g., buttons 240 in FIG. 2). Statistics for the previous prediction session are collected at the start of a new prediction session, e.g., when some activity occurs after a period of inactivity of at least 180 minutes. A variety of algorithms can be used to determine intelligent forward navigation targets, resulting in different types of predicted target resources. True favorites and navigation sequence targets may be determined by estimating the likelihood of accessing a resource or retracing a sequence of navigation steps, respectively, by determining the corresponding frequency distributions across the navigation history or its subset, as described below. Intelligent favorites and related resource predictions can be identified by calculating co-occurrence statistics within navigation sessions or navigation tails, respectively, across the entire navigation history or a subset of it.

True favorites may be identified using statistical analysis that involves all of the resources in the navigation history 600, resources in one or more navigation sessions 605, or selected resource types (e.g. suggested by the user, an application, or a service). For example, analysis may be based on targets such as the hubs discussed in related U.S. Patent Application for "Intelligent Backwards Resource Navigation," or from a previous analysis using the intelligent forward prediction buttons.

In any event, the resources are first filtered for all occurrences of the designated types of resources, such as typed, favorite, or predicted target resources. The raw frequencies for each distinct resource are calculated. To prevent frequently visited resources from dominating the statistical analysis, the frequencies are normalized by mapping the raw frequency values to values between 1 and 2 as follows:

$$f_s = 2 \times r_s / (r_s + 1)$$

where:
$f_s$ is the normalized resource access frequency for prediction session s; and
$r_s$ is the raw resource access frequency for a particular URL in prediction session s.

When statistics involves multiple navigation sessions, e.g., the entire navigation history or selected part of navigation history, the normalized frequency is added to the resource access frequency, calculated for previous sessions. In order to introduce a bias towards recently accessed resources, the normalized frequency value may be weighted or decayed for each session that passes using a decay factor, $\alpha$. The resource access score may be thus accumulated according to the following formula:

$$S_n = \alpha \times S_{n-1} + f_n$$

where
$S_n$ is the accumulated score for prediction session n
$\alpha$ is the decay factor ($0 < \alpha < 1$).

Thus, over multiple sessions n the accumulated resource access frequency may be defined as:

$$S_n = \alpha^{n-1} \times f_1 + \alpha^{n-2} \times f_2 + \alpha^{n-3} \times f_3 + \ldots + \alpha \times f_{n-1} + f_n$$

or $$S_n = \Sigma_{s=1}^{n} (\alpha^{n-s} \times f_s).$$

It is readily apparent that values of $\alpha$ close to 1 result in the slow decay of frequency scores with time.

Similar algorithm may be applied to identify targets of navigation sequences that have been frequently repeated by the user in the past. Navigation trails are analyzed for sequences of two, three, four, generally k consecutive navigation steps. For each pair, triple, quadruple, generally k-tuple of navigation steps, the frequency of occurrence may be calculated, normalized within a navigation session, and decayed over navigation sessions as described in the above formulas. As the user navigates through resources, at each step the most likely sequence of navigation of a specified length is determined, e.g., 3-step navigation, containing or starting with the currently viewed resource. This 3-step sequence is used to present to the user, by the presentation module 540, the link to the resource that corresponds to, e.g., the third step in the navigation sequence relative to the current resource. The length of predicted sequences considered by the algorithm may be specified by the user. In one implementation, updating of the sequence statistics is done at the end of the navigation session. In an alternative implementation, statistics update can be performed continually as the user browse through resources.

Intelligent favorites may be identified using statistical analysis of the navigation data lists 605 as follows. As with true favorites, statistics may be collected for intelligent favorites when a prediction session ends. Resources of a specified types, such as starts of trails, search result pages, and similar, are extracted and used in further analysis. These are candidate forward navigation targets that may thus include typed URL, favorites, true favorites or predictions, pages displayed following a form submit (e.g., search results), and others.

Statistics for all candidate resource co-occurrences may be calculated based on order, proximity, and frequency using windows 620 of resource sequences (e.g., windows 621-628 in FIGS. 6b and 6c). As illustrated in FIGS. 6b and 6c, a window 620 of size W (e.g., a set of three resource identifiers 610) is moved down the navigation data list 605 and a score incremented for each co-occurrence found within the window. By way of example, window 621 in FIG. 6b includes co-occurrences URLa:URLb; window 622 includes co-occurrences URLa:URLb, URLa:URLc, URLb:URLc; and so forth.

In an exemplary implementation, the window 620 may be shrunk at the beginning (e.g., illustrated by window 621 in FIG. 6a) and at the end (e.g., illustrated by window 628 in FIG. 6c) of the navigation data list 605 to avoid distortions. It is apparent that adjacent resources (e.g., URLa and URLb in window 621) will score more highly than those occurring further apart, having appeared together more frequently in the moving window 620.

Co-occurrences may be counted asymmetrically. More specifically, the co-occurrences of URLa followed by URLb are scored separately from those of URLb followed by URLa. When calculating predictions for a particular resource, rankings may be calculated on a symmetrical or asymmetrical basis.

The score for a co-occurrence, within a window 620, of two resources URLa (or "a") followed by URLb (or "b") is the raw count of such occurrences:

$$c_W(b|a)$$

The score for each co-occurrence within a prediction session N containing resources is a cumulative raw count:

$$c_N(b|a) = \Sigma c_W(b|a).$$

In the same way as is done for true favorites, scores are decreased over time by decaying the co-occurrence score for previous sessions before adding the old score to the new one, using a co-occurrence decay factor, $\beta$.

The co-occurrence frequency may be thus accumulated across n sessions according to the following formula:

$$C_n(b|a) = \beta \times C_{n-1}(b|a) + c_n$$

where $C_n(b|a)$ is the accumulated score for session 'n'

$\beta$ is the co-occurrence decay factor ($0 < \beta < 1$).

So over n sessions the accumulated co-occurrence frequency may be expressed as:

$$C_n(b|a) = \beta^{n-1} \times c_1(b|a) + \beta^{n-2} \times c_2(b|a) + \ldots + \beta \times c_{n-1}(b|a) + c_n(b|a)$$

or $$C_n(b|a) = \Sigma_{s=1}^{n}(\beta^{n-s} \times c_s(b|a)).$$

When a page with URLa is visited during a prediction session n, a ranked list of predictions is used for the resource. If asymmetrical scoring is implemented, the accumulated asymmetrical frequency (for all sessions up to but not including the current one which has not yet been processed) is used to calculate a score $S_n b$ for each predicted URLb:

$$S_n b = C_{n-1}(b|a)$$

If asymmetrical scoring is implemented, then a combined score is used for ranking:

$$S_n b = C_{n-1}(b|a) + C_{n-1}(a|b)$$

Similar procedure may be applied to resources in individual navigation trails, instead of navigation sessions, to calculate co-occurring pairs of resources. Such are related resource predictions: for the currently viewed resource the algorithm determines the most likely resource visited within the same navigation trail in the past.

In an exemplary implementation, resource co-occurrences (e.g., pairs) are also identified and counts incremented in a URL database table to rank resource targets. When refreshing the intelligent forward navigation tools (e.g., 230 in FIG. 2), the top ranked records are returned from the database table based on their weighted and time-decayed counts. Since some of the counts may not have been updated for some time, the time-decay calculation may be carried out within the stored procedure before ranking takes place. The stored procedure returns a list of records, where one of the pair of resources matches the currently accessed resource. The counter for these resources is updated (time-decayed) by the client to reflect the current prediction session.

Exemplary Operations

Described herein are exemplary methods for implementing intelligent forward resource navigation. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement intelligent forward resource navigation.

Figure 7:
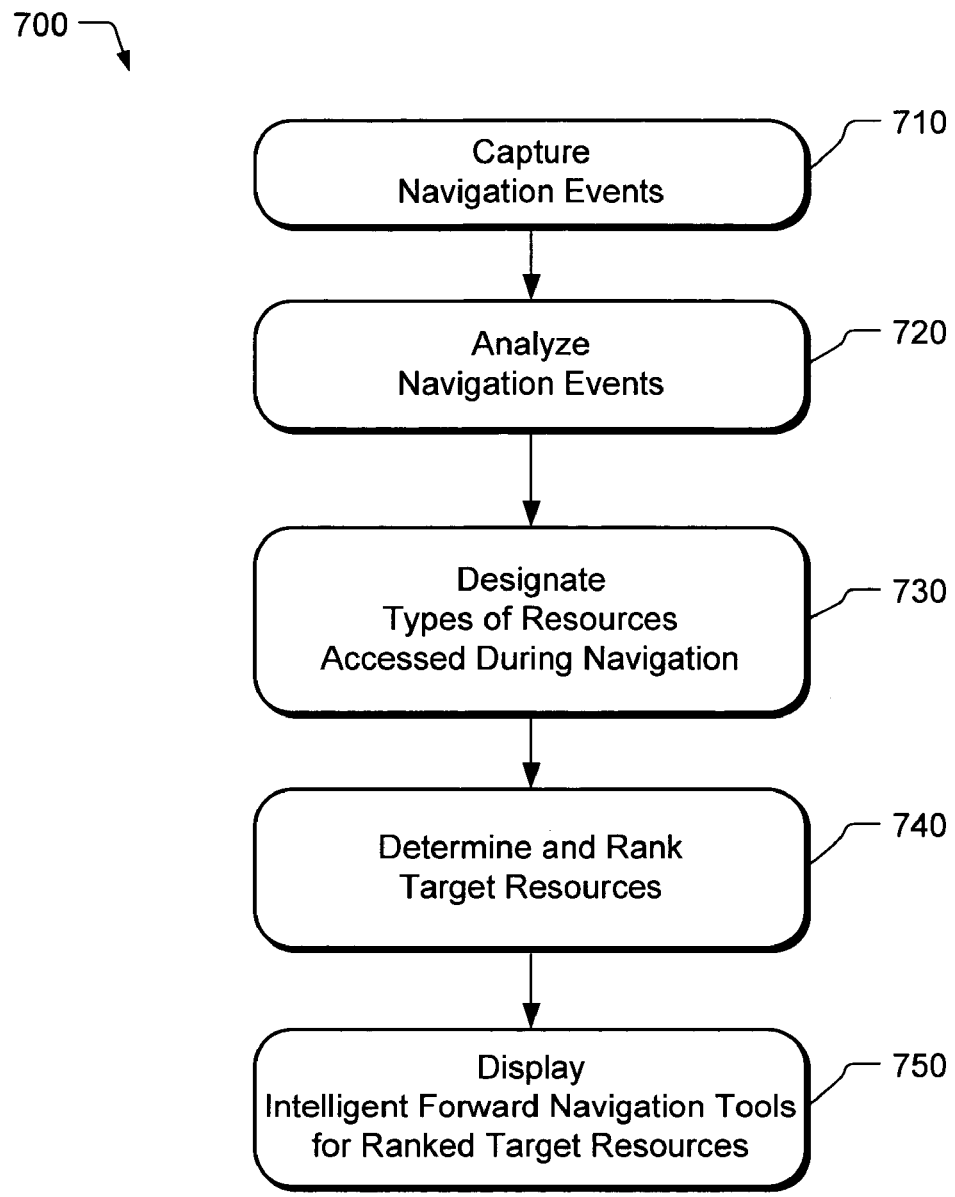
FIG. 7 is a flowchart illustrating exemplary operations to implement intelligent forward navigation.

FIG. 7 is a flowchart illustrating exemplary operations 700 to implement intelligent forward navigation. In operation 710 one or more navigation event(s) are captured. Capturing navigation events may include identifying and logging information relevant to a navigation history, such as, e.g., resource identifiers corresponding to visited resources, resource branching information, resource navigation sequence information, and a tally of the number of visits to each resource, to name only a few examples. The navigation events may be stored in a navigation history.

In operation 720 navigation events are analyzed to mark types of resources (e.g., search results, hubs, etc.) and structure of navigation history (e.g., in terms of navigation sessions, navigation tails, navigation sequences, etc.). In operation 730 one or more types of resources that were accessed during a navigation session may be designated as forward target resources, e.g., based on the statistical analysis. In operation 740 navigation events may be analyzed according to the statistical algorithms described in more detail above and forward target resources may be determined and ranked.

In operation 750, intelligent forward navigation tools may be displayed for the ranked forward target resources, e.g., in a browser. In general, when the user selects an intelligent forward navigation button, browser may point to a forward target resource corresponding to the selected button. Alternatively, if the user hovers over the button, a summary (e.g., thumbnail image) of the forward target resource may be displayed.

The operations shown and described herein are merely illustrative of an exemplary implementation of intelligent forward resource navigation. It is noted that the operations are not limited to any particular order. In addition other operations not shown in FIG. 7 may also be implemented to enable intelligent forward resource navigation.

Exemplary Computing Device

Figure 8:
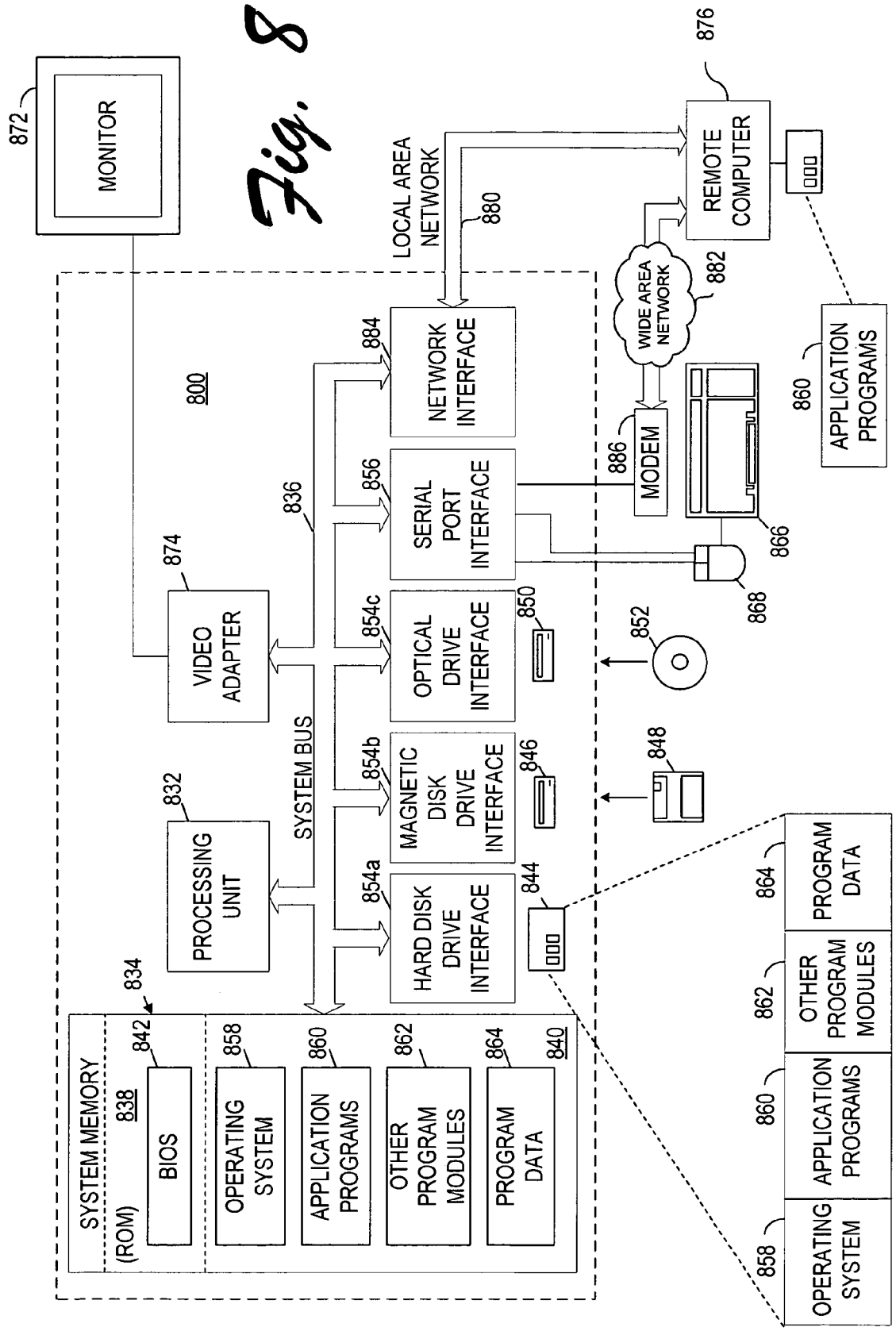
FIG. 8 illustrates a generalized computing device that may be used to implement intelligent forward navigation.

FIG. 8 is a schematic illustration of an exemplary computing device 800 that may be used to implement the exemplary systems, methods, and user interfaces discussed herein. Computing device 800 includes one or more processors or processing units 832, a system memory 834, and a bus 836 that couples various system components including the system memory 834 to processors 832. The bus 836 represents one or more of any of several types of bus structures, including a memory bus or memory controller, a peripheral bus, an accelerated graphics port, and a processor or local bus using any of a variety of bus architectures. The system memory 834 includes read only memory (ROM) 838 and random access memory (RAM) 840. A basic input/output system (BIOS) 842, containing the basic routines that help to transfer information between elements within computing device 800, such as during start-up, is stored in ROM 838.

Computing device 800 further includes a hard disk drive 844 for reading from and writing to a hard disk (not shown), and may include a magnetic disk drive 846 for reading from and writing to a removable magnetic disk 848, and an optical disk drive 850 for reading from or writing to a removable optical disk 852 such as a CD ROM or other optical media. The hard disk drive 844, magnetic disk drive 846, and optical disk drive 850 are connected to the bus 836 by appropriate interfaces 854a, 854b, and 854c.

The drives and their associated computer-readable media provide nonvolatile storage of computer-readable instructions, data structures, program modules and other data for computing device 800. Although the exemplary environment described herein employs a hard disk, a removable magnetic disk 848 and a removable optical disk 852, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 844, magnetic disk 848, optical disk 852, ROM 838, or RAM 840, including an operating system 858, one or more application programs 860, other program modules 862, and program data 864. A user may enter commands and information into computing device 800 through input devices such as a keyboard 866 and a pointing device 868. Other input devices (not shown) may include a microphone, joystick, game pad, satellite dish, scanner, or the like. These and other input devices are connected to the processing unit 832 through an interface 856 that is coupled to the bus 836. A monitor 872 or other type of display device is also connected to the bus 836 via an interface, such as a video adapter 874.

Generally, the data processors of computing device 800 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 800. At execution, the programs are loaded at least partially into the computing device's 800 primary electronic memory.

Computing device 800 may operate in a networked environment using logical connections to one or more remote computers, such as a remote computer 876. The remote computer 876 may be a personal computer, a server, a router, a network PC, a peer device or other common network node, and typically includes many or all of the elements described above relative to computing device 800. The logical connections depicted in FIG. 8 include a LAN 880 and a WAN 882. The logical connections may be wired, wireless, or any combination thereof.

The WAN 882 can include a number of networks and subnetworks through which data may be routed from the computing device 800 and the remote computer 876, and vice versa. The WAN 882 can include any number of nodes (e.g., DNS servers, routers, etc.) by which messages are directed to the proper destination node.

When used in a LAN networking environment, computing device 800 is connected to the local network 880 through a network interface or adapter 884. When used in a WAN networking environment, computing device 800 typically includes a modem 886 or other means for establishing communications over the wide area network 882, such as the Internet. The modem 886, which may be internal or external, is connected to the bus 836 via a serial port interface 856.

In a networked environment, program modules depicted relative to the computing device 800, or portions thereof, may be stored in the remote memory storage device. It will be appreciated that the network connections shown are exemplary and other means of establishing a communications link between the computers may be used.

The computing device 800 may be implemented as a server computer that is dedicated to server applications or that also runs other applications. Alternatively, the computing device 800 may be embodied in, by way of illustration, a stand-alone personal desktop or laptop computer (PCs), workstation, personal digital assistant (PDA), or electronic appliance, to name only a few.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media may be any available media that may be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" mean a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A method comprising:
    analyzing previous navigations performed by a user profile during one or more previous browser sessions;
    determining a group of navigations, wherein a user associated with the user profile initiates each of the group of navigations within single sessions of the one or more previous browser sessions at a frequency greater than or equal to a threshold frequency, the frequency being determined by
        determining a co-occurrence score for two of the group of navigations in a most recent previous browser session of the one or more previous browser sessions,
        determining an accumulated frequency score for the one or more previous browser sessions other than the most recent previous browser session,
        multiplying the accumulated frequency score by a co-occurrence decay factor to produce a decayed accumulated frequency score, and
        adding the decayed accumulated frequency score to the co-occurrence score;
    determining a current session;
    predicting a set of ranked forward targets, wherein when at least one of the group of navigations has been initiated during the current session, the set includes all members of the group of navigations which have not been initiated during the current session and the set excludes all members of the group of navigations which have been initiated during the current session; and
    displaying in a browser intelligent navigation tools corresponding to the set of ranked forward targets, wherein analyzing previous navigations, determining the group of navigations, determining a current session, predicting the set and displaying are controlled by a processor.

2. The method of claim 1 wherein analyzing previous navigations includes analysis of a structure and content of resources accessed by the user.

3. The method of claim 1 wherein the previous navigations are statistically analyzed.

4. The method of claim 1 wherein the ranked forward targets are based on a combination of statistical algorithms.

5. The method of claim 4 wherein the combination of statistical algorithms are user-selected.

6. The method of claim 4 wherein the combination of statistical algorithms is automatically selected based on the use of suggested resources.

7. The method of claim 1 wherein predicting a set of ranked forward targets is relative to a current navigation context.

8. The method of claim 1 further comprising recording the previous navigations performed by a user profile.

9. The method of claim 1 wherein the previous navigations are recorded by associating types to the resources accessed in previous navigations.

10. The method of claim 1 further comprising providing a shortcut to the ranked forward targets.

11. The method of claim 1 wherein displaying the intelligent navigation tools includes displaying at least one of the following: a true favorites button, an intelligent favorites button, navigation sequence predictions, and related resource predictions.

12. The method of claim 1 wherein displaying the intelligent navigation tools includes displaying an overflow button.

13. The method of claim 1 further comprising displaying a preview window if the user hovers over the intelligent navigation tools, the preview window displaying at least a portion of a navigation target associated with the intelligent navigation tools; and navigating to the navigation target when the user selects the preview window.

14. The method of claim 1 further comprising ordering the set of ranked forward targets for display in a browser.

15. The method of claim 1 wherein predicting the ranked forward targets is based on asymmetric co-occurrences in the structure of previous navigations.

16. The method of claim 1 wherein predicting the ranked forward targets is based on symmetric co-occurrences in the structure of previous navigations.

17. A system for intelligent forward navigation among resources comprising:
    a processor operating with a memory to provide:
    an analysis module to analyze previous navigations performed by a user profile during one or more previous browser sessions;
    a navigation group determination module configured to determine a group of navigations, wherein a user associated with the user profile initiates each of the group of navigations within single sessions of the one or more previous browser sessions at a frequency greater than or equal to a threshold frequency, the frequency being determined by
        determining a co-occurrence score for two of the group of navigations in a most recent previous browser session of the one or more previous browser sessions,
        determining an accumulated frequency score for the one or more previous browser sessions other than the most recent previous browser session,
        multiplying the accumulated frequency score by a co-occurrence decay factor to produce a decayed accumulated frequency score, and
    adding the decayed accumulated frequency score to the co-occurrence score;
    a session determination module configured to determine a current session;
    a prediction module to predict a set of ranked forward targets, wherein when at least one of the group of navigations has been initiated during the current session, the set includes all members of the group of navigations which have not been initiated during the current session and the set excludes all members of the group of navigations which have been initiated during the current session; and
    a presentation module to render intelligent forward navigation tools corresponding to the set of ranked forward targets.

18. The system of claim 17 wherein the prediction module predicts a set of ranked forward targets relative to a current navigation context.

19. The system of claim 17 further comprising an event capture module to detect and log previous navigations performed by the user profile during one or more browser sessions.

20. The system of claim 17 further comprising a target detection module to identify and designate resource identifiers in a structure of the previous navigations as forward targets.

21. The system of claim 17 wherein the presentation module displays a shortcut to the ranked forward targets.

22. The system of claim 17 further comprising at least one of the following: a true favorites button, an intelligent favorites button, navigation sequence predictions, and related resource predictions.

23. The system of claim 17 further comprising an overflow button corresponding to the set of ranked forward targets.

24. The system of claim 17 further comprising a preview window displayed if the user hovers over intelligent navigation tools corresponding to the set of ranked forward targets, the preview window displaying at least a portion of a navigation target associated with the intelligent navigation tools; and a navigation module configured to navigate to the navigation target when the user selects the preview window.

25. The system of claim 17 wherein the prediction module predicts the ranked forward targets based on asymmetric co-occurrences in the previous navigations.

26. The system of claim 17 wherein the prediction module predicts the ranked forward targets based on symmetric co-occurrences in the previous navigations.

27. A computer program product storing a computer program for executing a computer process on a computer system, the computer process comprising:
analyzing previous navigations performed by a user profile during one or more previous browser sessions; determining a group of navigations, wherein a user associated with the user profile initiates each of the group of navigations within single sessions of the one or more previous browser sessions at a frequency greater than or equal to a threshold frequency, the frequency being determined by
determining a co-occurrence score for two of the group of navigations in a most recent previous browser session of the one or more previous browser sessions,
determining an accumulated frequency score for the one or more previous browser sessions other than the most recent previous browser session,
multiplying the accumulated frequency score by a co-occurrence decay factor to produce a decayed accumulated frequency score, and
adding the decayed accumulated frequency score to the co-occurrence score;
determining a current session;
predicting a set of ranked forward targets, wherein when at least one of the group of navigations has been initiated during the current session, the set includes all members of the group of navigations which have not been initiated during the current session and the set excludes all members of the group of navigations which have been initiated during the current session; and
displaying in a browser intelligent navigation tools corresponding to the set of ranked forward targets, wherein analyzing previous navigations, determining the group of navigations, determining a current session, predicting the set and displaying are controlled by a processor.

28. The computer program product of claim 27 wherein the computer process further comprises statistical analysis of previous navigations.

29. The computer program product of claim 27 wherein the computer process further comprises analyzing a structure and content of resources accessed by the user.

30. The computer program product of claim 27 wherein the computer process further comprises ranking forward targets based on a combination of statistical algorithms.

31. The computer program product of claim 30 wherein the computer process further comprises implementing a user-selected combination of statistical algorithms.

32. The computer program product of claim 30 wherein the computer process further comprises automatically selecting the combination of statistical algorithms based on the use of suggested resources.

33. The computer program product of claim 27 wherein the computer process further comprises predicting a set of ranked forward targets relative to a current navigation context.

34. The computer program product of claim 27 wherein the computer process further comprises recording the previous navigations performed by a user profile.

35. The computer program product of claim 27 wherein the computer process further comprises generating a shortcut to the ranked forward targets.

36. The computer program product of claim 27 wherein the computer process further comprises displaying at least one of the following: a true favorites button, an intelligent favorites button, a navigation sequence predictions, and related resource predictions.

37. The computer program product of claim 27 wherein the computer process further comprises displaying an overflow button corresponding to the set of ranked forward targets.

38. The computer program product of claim 27 wherein the computer process further comprises displaying a preview window if the user hovers over intelligent navigation tools corresponding to the set of ranked forward targets, the preview window displaying at least a portion of a navigation target associated with the intelligent navigation tools; and navigating to the navigation target when the user selects the preview window.

39. The computer program product of claim 27 wherein the computer process further comprises ordering the set of ranked forward targets for display in a browser.

40. The computer program product of claim 27 wherein the computer process further comprises predicting the ranked forward targets based on asymmetric co-occurrences in the previous navigations.

41. The computer program product of claim 27 wherein the computer process further comprises predicting the ranked forward targets based on symmetric co-occurrences in the previous navigations.

* * * * *